United States Patent [19]

Verenski et al.

[11] Patent Number: 5,615,968
[45] Date of Patent: Apr. 1, 1997

[54] HAND RAIL COUPLER SYSTEM

[75] Inventors: Douglas R. Verenski, Enon Valley; Thomas E. Bayer, Greenville, both of Pa.

[73] Assignee: Werner Co., Greenville, Pa.

[21] Appl. No.: 529,967

[22] Filed: Sep. 19, 1995

[51] Int. Cl.⁶ ............................................. F16B 7/04
[52] U.S. Cl. .................. 403/312; 403/309; 403/196; 256/65; 182/179
[58] Field of Search .................... 403/312, 309, 403/300, 196, 192, 373, 344; 256/59, 65, 68, 69; 182/179, 178, 113; 285/370–371, 397–398, 403, 405

[56] References Cited

U.S. PATENT DOCUMENTS

| | | |
|---|---|---|
| 1,115,912 | 11/1914 | Dodson . |
| 2,169,069 | 8/1939 | Kaufman ............................. 285/13 |
| 2,273,102 | 2/1942 | Harris et al. ......................... 287/58 |
| 2,814,508 | 11/1957 | Seamark ........................... 285/371 X |
| 3,107,900 | 10/1963 | De Paolo ............................ 256/59 X |
| 3,336,004 | 8/1967 | Edie et al. ............................. 256/65 |
| 3,804,542 | 4/1974 | Hammerschmidt ................. 403/264 |
| 3,820,909 | 6/1974 | Schindler et al. ................... 403/205 |
| 4,397,088 | 8/1983 | Hampel ............................ 403/312 X |
| 4,477,059 | 10/1984 | Willis ................................... 256/65 |
| 4,828,221 | 5/1989 | Scobie et al. ....................... 251/308 |
| 4,848,954 | 7/1989 | Wiseman ............................ 403/312 |
| 4,998,841 | 3/1991 | Wilde ................................. 403/104 |
| 5,149,144 | 9/1992 | Blakeley .............................. 285/23 |
| 5,269,118 | 12/1993 | Bullaro ................................ 53/315 |
| 5,370,368 | 12/1994 | Terrels et al. ........................ 256/19 |
| 5,421,624 | 6/1995 | Hayashi et al. ................. 285/370 X |

FOREIGN PATENT DOCUMENTS

| | | | |
|---|---|---|---|
| 1219679 | 5/1960 | France | ...................................... 256/65 |
| 3245358 | 6/1984 | Germany | ................................ 403/312 |

OTHER PUBLICATIONS

Brochure by Burton's Scaffolding International, West Midlands, UK: *The "Unique" Range of Scaffold Couplers*, 2 pp.

Primary Examiner—Harry C. Kim
Attorney, Agent, or Firm—Kenyon & Kenyon

[57] ABSTRACT

A staging system has a hand rail coupler system with an inner coupling tube which interconnects two coaxially aligned hand rail sections. A pair of opposed coupler clamps are aligned over the interconnected hand rail sections. A studded knob extends through the opposing coupler clamps and the inner coupling tube and is connected to a nut. Rotation of the studded knob acts to tighten the coupler clamps to hold the hand rail sections in place.

21 Claims, 4 Drawing Sheets

HAND RAIL COUPLER SYSTEM

BACKGROUND OF THE INVENTION

The present invention relates generally to scaffolds and staging systems for supporting workmen and materials during the erecting, repairing, painting and the like of structures and, more particularly to a coupler system for interconnecting coaxially aligned hand rail sections.

Staging systems are used to support workmen and materials during the performance of a variety of tasks at elevated heights above the ground. A number of methods know to those skilled in the art are available to lift the staging and support it at the desired working elevation. Normally, these staging systems include some type of hand rail system to protect the workmen from falling or otherwise injuring themselves while performing tasks at some level above ground. In addition to the hand rail system, staging generally includes a platform to which are attached a number of vertical posts which are connected to hand rails. Typically, vertical posts are located at each end of the platform and several vertical posts are located between those end posts along the edges of the platform. As many as 6 or 7 vertical supports may be located along one platform side, depending on the length of the platform. Brackets are fitted on the posts to support the hand rail system. Once the brackets are positioned on the posts, hand rail sections are horizontally inserted through a series of brackets on each side of the platform to form the hand rail of the staging system.

The components of a staging system are usually transported by truck to a delivery point or for assembly at a job site. These hand rail sections are typically shipped in 10 to 40 foot lengths. As the rails increase in length, the difficulties associated with shipping increase. For example, the long lengths make it more difficult to adequately package the rails for shipping, resulting in more likelihood of damage to the rails in transit. In addition, as the lengths of the rail sections increase, it becomes more difficult to slide the handrail through the series of brackets mounted at the tops of the vertical posts. Longer rails may also be more difficult to handle when there is only limited space available for assembly of the hand rails. When disassembling the staging, the long lengths of hand rails are equally difficult to remove from the brackets. These difficulties in shipping and assembly repeat themselves when the staging is disassembled and moved to a different location for reassembly.

One way to overcome these problems is to assemble the staging using shorter hand rail sections that are coupled together. Various coupling devices are currently available. For example, U.S. Pat. No. 1,115,912 issued to Dodson in 1914 and entitled "Pipe-Coupling" discloses joining axially spaced pipe sections using a threaded coupler and a threaded bushing. Similarly, U.S. Pat. No. 2,169,069 issued to Kaufman in 1939 and entitled "Pipe Union and Fitting" discloses the use of threaded couplers to join a pair of axially spaced pipe sections. Although this type of coupler can join coaxially aligned lengths of pipe, it requires that threads be machined onto the ends of the rail sections. This requirement for threaded ends results in increased expense and assembly time to join the sections. Couplers such as a sleeve coupler and a split joint pin are also available as illustrated in the advertising material of Burton's Scaffolding International for "UNIQUE" scaffold couplers. However, these couplers require the use of tools for assembly.

The present invention is directed to a staging system having a hand rail coupling system for quick, easy and toolless coupling of coaxially aligned hand rail sections.

SUMMARY OF THE INVENTION

The present invention overcomes many of the problems discussed above with respect to assembling the hand rails on staging. In particular, a feature of the invention which overcomes these problems has a hand rail coupling system having an inner coupling tube and opposing coupler clamps secured by a studded knob having a threaded end. The inner coupling tube has a hole through the diameter of the tube to accommodate the studded knob. Two coupler clamps, each clamp having a hole to accommodate the studded knob, are positioned on opposite sides of the coupling tube so that the hole in each clamp is aligned with the corresponding hole in the coupling tube. The shank of the knob is then inserted through the aligned holes of the clamps and the coupler tube and a threaded nut is hand threaded onto the end of the knob. Prior to tightening the nut and knob, each open end of a hand rail section is placed over one end of the coupling tube and positioned to rest beneath the opposing coupler clamps. Rotation of the knob by hand acts to tighten the clamps, thereby holding the hand rail sections in place.

The coupler clamps are easily assembled and disassembled, resulting in a quick, toolless disconnect of rail sections. Use of the hand rail coupler system also permits shorter rail sections to be used, thus reducing shipping difficulties that occur with the transport of long hand rails and making it easier to manipulate the hand rails during assembly and disassembly of the staging. This hand rail coupler system can also be readily used to join existing hand rails in the field without requiring any modifications to the hand rails, such as threading the ends.

Other advantages of the invention will be readily understood from the following description of the invention and the accompanying drawings.

DETAILED DESCRIPTION

Figure 1:
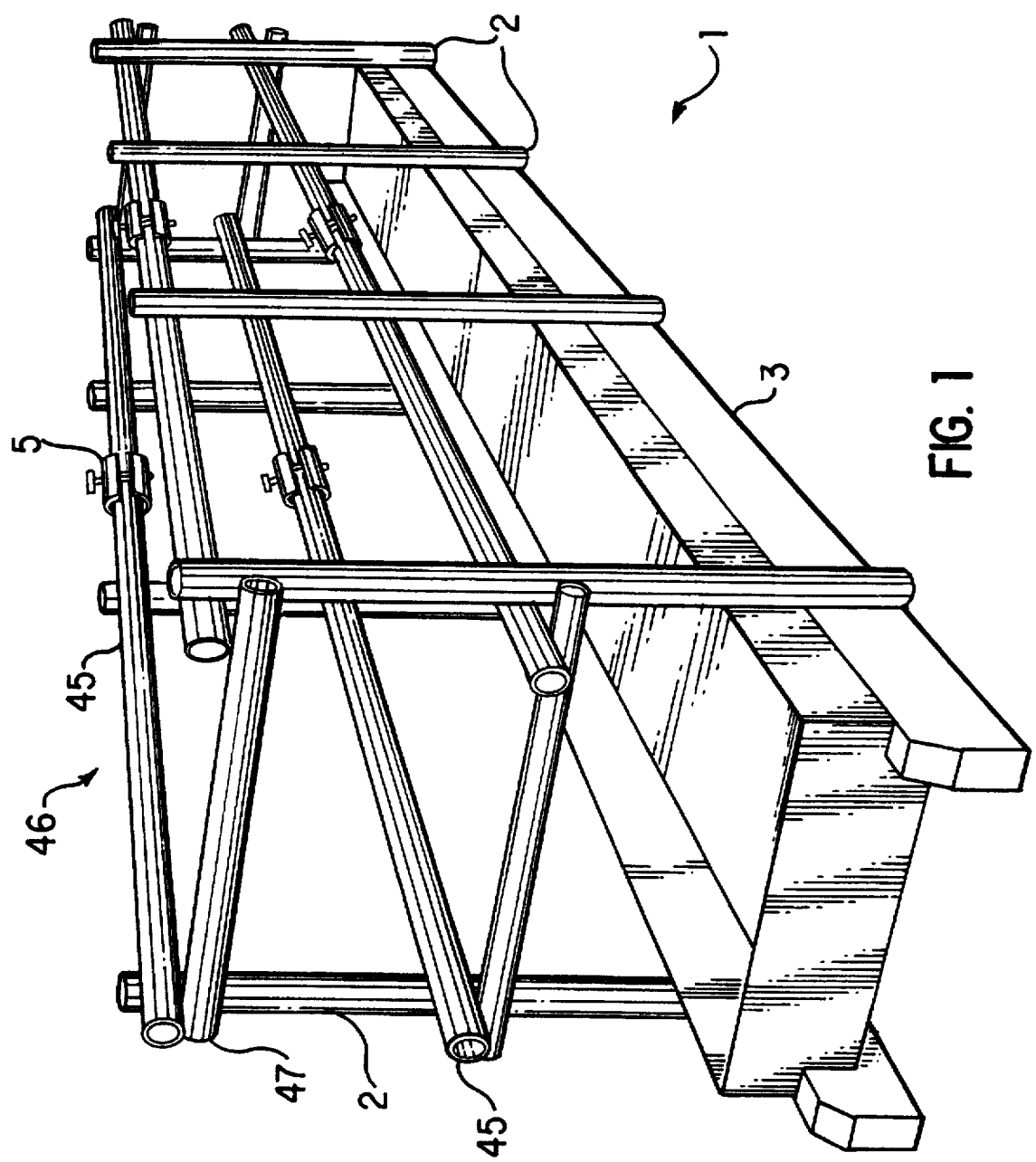
FIG. 1 is a schematic illustration of a staging system constructed according to the principles of the present invention.

As illustrated in FIG. 1, the preferred embodiment of the present invention is an aluminum staging system 1 having an upper and lower hand rail. The staging system includes vertical posts 2 attached to a platform 3. Also included in a staging system are releasable clamps (not shown) for attaching the vertical posts 2 to the platform 3 and for supporting hand rail sections 45, 47. The component parts of the staging assembly are typically delivered to a job site for assembly. In the example shown in FIG. 1, the staging assembly 1 includes a platform 3, eight vertical posts 2, four end hand rails 47, eight hand rail sections 45, four coupler clamp assemblies 5 and a sufficient number of clamps to secure the vertical posts to the platform and to support the hand rails. To assemble the components into a staging assembly, the eight vertical posts 2 are attached with brackets along the length of each side of the platform 3. Additional brackets for supporting the hand rails 45, 47 are then attached to the vertical posts 2 at the desired height for the upper and lower hand rails. Both the brackets for attaching the vertical posts to the platform and the brackets attached to the vertical posts to support the hand rails can be any of a number of releasable clamping devices known to one of skill in the art. Once the hand rail support brackets are attached to the vertical posts 2, the upper and lower end hand rails 47 are inserted horizontally through brackets across each end of the platform 3. To form the tipper and lower hand rail assembly along each side of the platform, four hand rail sections 45 are inserted horizontally through brackets mounted on the vertical posts 2. The two hand rail sections 45 forming the upper rail and the two hand rail sections 45 forming the lower rail, each meet at approximately half the length of the platform 3. The paired hand rail sections 45 should be coaxially aligned. A coupling system 5 is then attached to the ends of the rail sections 45 that meet at the midpoint of the platform 3 in order to secure a joint between the paired hand rail sections 45.

Figure 2:
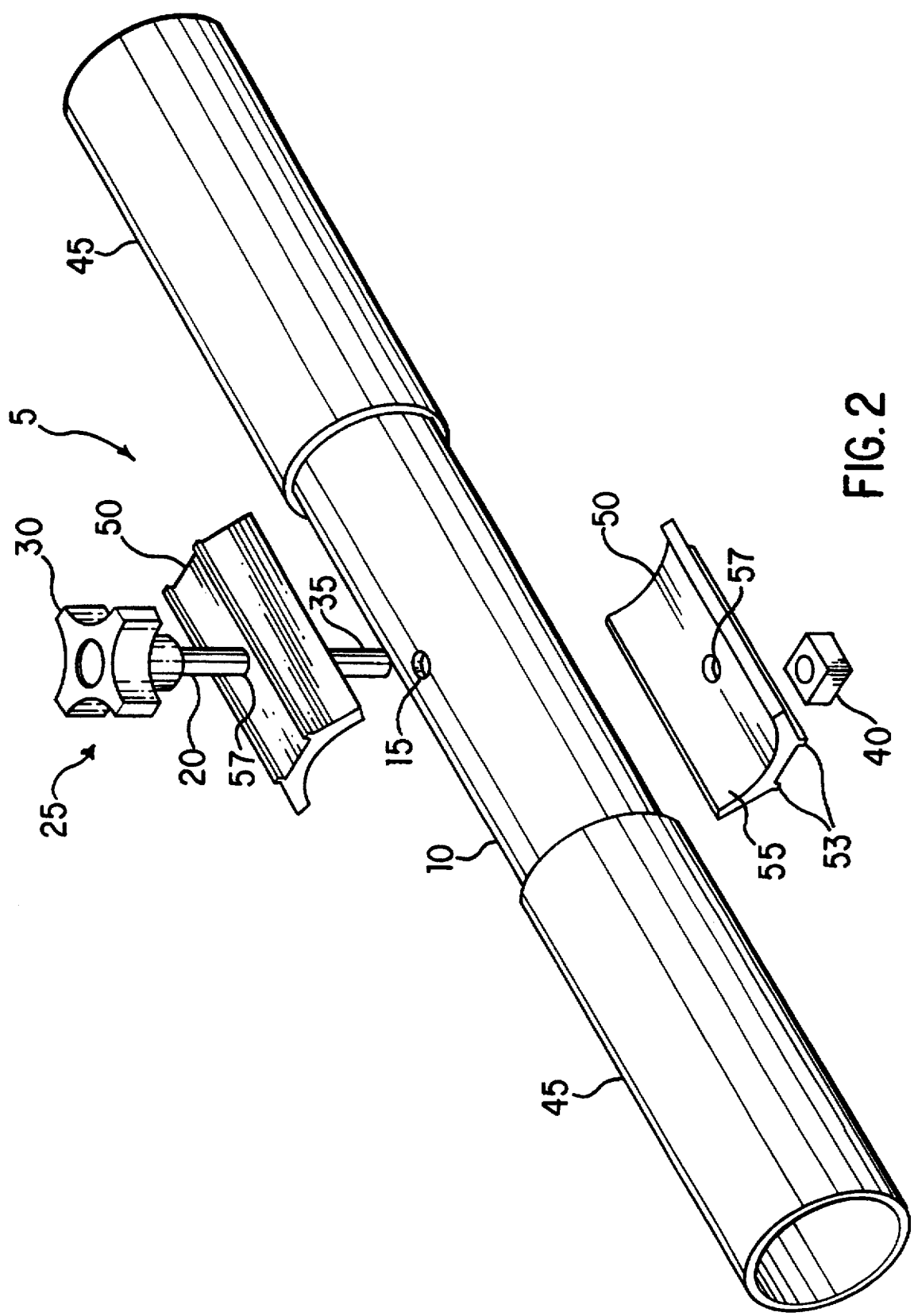
FIG. 2 is an exploded view of an embodiment of the hand rail coupler system shown in FIG. 1.
Figure 3:
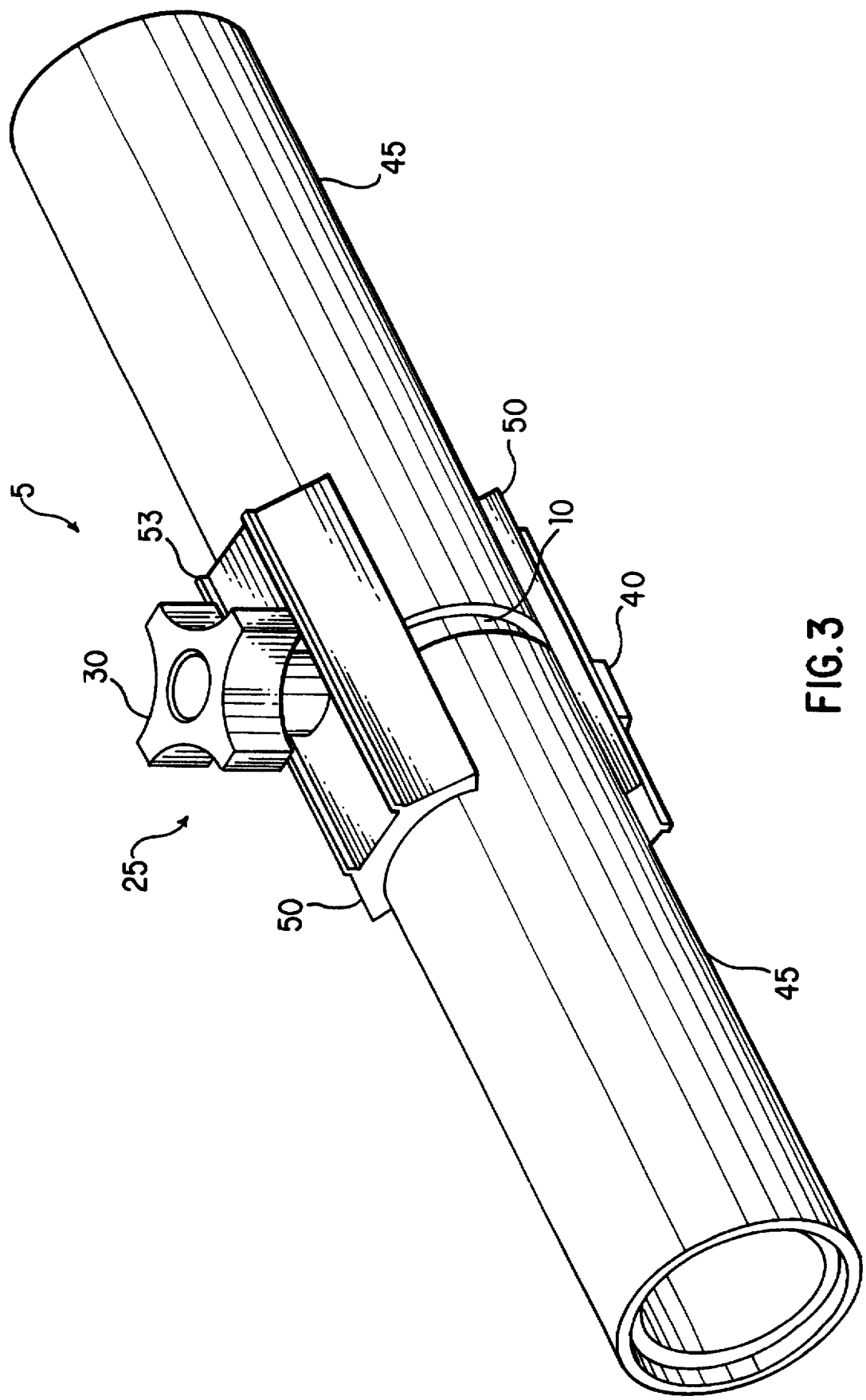
FIG. 3 is a view of the hand rail coupler system with the studded knob engaging the coupler clamps.

Referring to FIGS. 2 and 3, the coupler clamp assemblies 5 are shipped to a job site preassembled and thus only require insertion of the coupling tube 10 into the open ends of the rail sections 45 and tightening of the clamps 50 in order to join the rail sections. The coupler clamp assembly 5 has a coupling tube 10, two coupler clamps 50, a studded knob 25 and a nut 40. The coupling tube 10 has a hole 15 extending through the diameter. To assemble the coupler clamp assemblies, opposing clamps 50, each clamp 50 having a hole 57, are placed over the coupling tube. The clamps 50 should be positioned so that the holes 57 in the clamps 50 are aligned with the hole 15 through the coupling tube 10. A studded knob 25 is then inserted through the aligned holes of the clamps and the coupling tube and a nut 40 is then threaded onto the protruding end 35 of the studded knob far enough that a portion of the threaded end 35 extends beyond the outer surface of the nut. The threaded end 35 of the knob is then crimped to keep the nut on the threaded knob 25. To attach the coupler clamp assembly 5 to coaxially aligned hand rail sections 45, the coupling tube 10 is inserted into each of the open ends of the hand rail sections 45 so that the coupling clamps 50 extend over the open ends of the hand rail sections 45 being joined. The knob 25 is then manually tightened to secure the joint with the clamps 50.

Various lengths of coaxially aligned hand rail sections 45 are joined by a hand rail coupling system 5 to construct the length of hand rail 46 required for a given size of staging. Typically, the finished hand rail length on a platform side may range from about 8 to 40 feet, corresponding to the length of the platform. The platforms are available in a variety of sizes and carry different load ratings. In addition, the hand rail systems on staging must comply with federal requirements for ultimate load capacity. In this embodiment, two horizontal hand rails 46 are located on each side of the platform 3 and two horizontal handrails 47 are located on each end of the platform 3. Once the staging system is assembled, a variety of methods (not shown) known to those skilled in the art may be used to lift the staging system and support it at the desired elevation above the ground.

Referring to FIGS. 2 and 3, the assembly of the finished hand rail length from shorter rail sections is facilitated by a hand rail coupling system 5 which has an inner coupling tube 10 with a hole 15 through the diameter of the tube. This hole 15 through the inner coupling tube 10 is large enough to accommodate the shank 20 of a studded knob 25. The studded knob has a cap end 30 and a threaded end 35. The cap end 30 is conveniently shaped to permit the studded knob to be hand tightened in a threaded nut 40. In addition to a studded knob, the coupler clamps may be secured to the pipe sections with a cam-type clamping mechanism at the end of a studded knob. The shape of the inner coupling tube 10 generally corresponds to the shape of the inner surface of the rail sections 45 to be joined. The outer diameter of the coupling tube 10 is slightly smaller than the inner diameter of the rail sections 45 to form a clearance fit so that the inner coupling tube can slide into the opens ends of the rail sections. However, the tolerance between the inner coupling tube 10 and the rail sections 45 should be close enough so that the inner coupling tube 10 provides stability to the joint. For example, in a hand rail section having a nominal outer diameter of 1.9 inches and a nominal inner diameter of 1.682 inches, an inner coupling tube having a nominal outer diameter of about 1.660 inches has been shown to work well.

The length of the inner coupling tube 10 should be long enough to extend a sufficient distance into each rail section 45 to provide adequate joint strength such as bending strength and to keep the coupling tube disposed in the rail sections in the event of axial displacement of the coupling tube or the rail sections. However, the inner coupling tube length should not be so long that coupling becomes difficult or impractical. The appropriate length of the inner coupling tube depends on the diameter of the rail sections and the desired application. For example, an inner coupling tube length of about 8 to 16 inches has performed well for circular aluminum hand rail sections having an approximate outer diameter of 1.9 inches.

As shown in FIGS. 2 and 3, two coupler clamps 50 are provided. Each coupler clamp 50 has an inner surface 55 with a configuration generally corresponding to that of the outer surface of the hand rail sections 45 being joined. A hole 57 extends through each coupler clamp 50 large enough to accommodate the shank of the studded knob 35. The bottom coupler clamp against which the nut is tightened has raised longitudinal ridges 53 spaced apart a distance slightly greater than one side of the nut so that the nut rests between the raised ridges. These raised ridges 53 then act to prevent rotation of the nut 40 when the studded knob is tightened. Axially aligned ridges 53 located along the length of one or both coupler clamps 50 provide additional rigidity to the coupler clamps.

Figure 4:
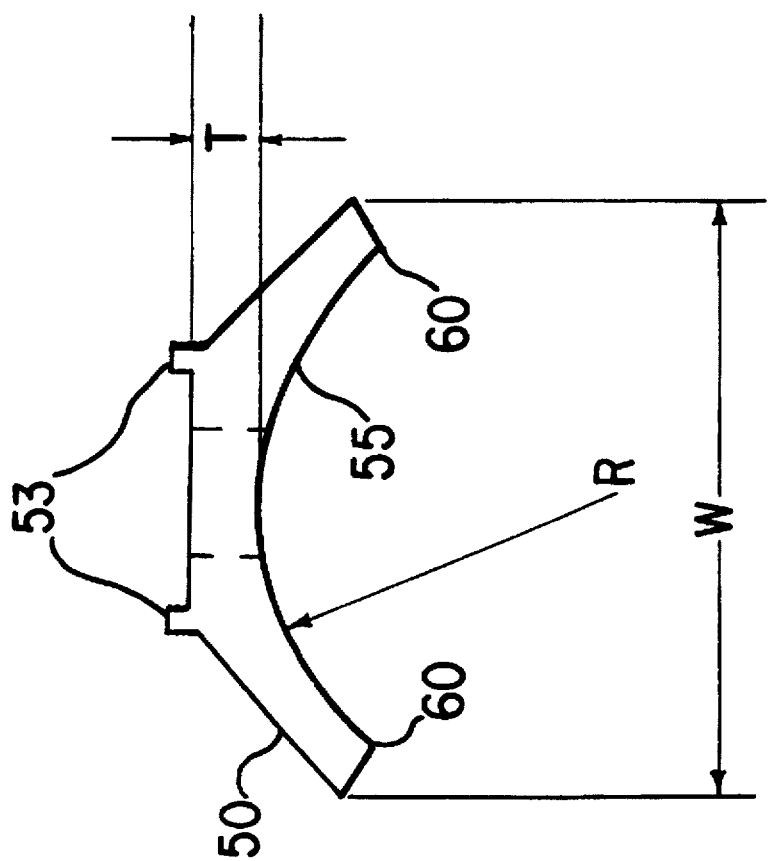
FIG. 4 is a side view of an embodiment of one of the coupler clamps.

Referring to FIG. 4, although the inner surface of each clamp generally conforms to the outer surface of the rail sections, it is advantageous to make the radius R of the inner clamp surface slightly smaller than the radius of the outer surface of the rail sections. For example, for a rail section having a nominal outer diameter of 1.9 inches, a nominal radius R of 0.900 inches for the inner surface of the coupler clamp has been found to work well. A nominal coupler clamp width W of 1.674 inches may be used for clamps that are about 3 inches long. The portion of the coupler clamp contacting the rail section will be the outer edges 60 of the inner surface. By having this localized area of contact, it is less likely that any fluid present on the surface of the rail sections will be trapped as a film where it could act as a lubricant. The thickness T of the coupler clamp should be sufficient to resist deformation as the studded knob tightens the clamps on the rail sections. For example, a nominal thickness T of 0.186 inches is suitable for the coupler clamp illustrated in this embodiment.

To couple coaxially aligned lengths of rail sections 45, each end of the inner coupling tube 10 is inserted into an open end of each rail section 45. The inner coupling tube 10 is inserted until the ends of each rail section are adjacent to the hole 15 in the inner coupling tube 10. The coupler clamps 50 are then placed over the inner coupling tube 10 and the rail sections 45, with the holes 57 in each coupler clamp aligned over the hole 15 in the inner coupling tube. The studded knob 25 is then inserted through the aligned holes on the coupler clamps and the coupling tube. A nut 40 is threaded onto the threaded end of the studded knob 35 and the studded knob is tightened in the nut to secure the coupler clamps 50 on the rail sections 45. The presence of the studded knob 25 also acts to prevent either end of the inner coupling tube 10 from moving too far into either rail section 45.

In an alternate embodiment of the present invention, the coupler clamps and the inner coupling tube do not have holes and the coupler clamps are secured to the rail sections using conventional, releasable couplers, clamps or fasteners.

Though the present invention has been described with reference to specific embodiments selected for the purpose of illustration, it should be understood that numerous modifications could be applied by those skilled in the art without departing from the basic concept and scope of the present invention.

For example, although the present invention has been illustrated for staging having circular hand rail sections, the sections being joined can be any hollow pipe or shaft configuration, e.g., circular, rectangular, triangular or any combination of these configurations. Depending on the configuration of the sections being joined, the configurations of the inner coupling tube and the coupler clamps should be modified to generally complement the respective inner and outer surfaces of the joined sections. The inner surface of the coupler clamps can also be configured to more closely conform to the outer surface configuration of the rail sections, resulting in increased contact area. For example, the radius of the inner surface of the coupler may be the same as the radius of the outer surface of the pipe sections being joined. The material of the inner coupling tube, the clamps and the studded knob and nut may be of the same material as the joined pipe sections or any other material (e.g. metals, ceramics or plastics) that has sufficient strength and stability in the use environment in which the coupled pipe sections are used. In addition, the material used for the inner coupling tube should not have a significantly higher rigidity than the joined pipe sections in order to prevent the more rigid inner coupling tube from damaging the pipe sections when the joint bends. Although the coupler clamp assemblies are generally shipped preassembled to the job site, they may also be shipped as component parts for assembly and attachment to the pipe sections at the job site. When shipped in their component parts, the threaded ends of the studded knobs would not be crimped prior to assembly, nor would it be crimped at all in cases in which it was desirable to make the nut removable. Although the present invention is particularly suitable for assembling staging having hand rail sections, it is understood by those of ordinary skill in the art that the present coupling system may be used for any application requiring the coaxial joining of hollow pipe or shaft sections.

What is claimed is:

1. A pipe coupler system for joining two coaxially aligned hollow pipe sections, wherein each hollow pipe section has an upper surface and a lower surface, comprising:
    a coupling tube having an outer surface conformable to an inner surface of said each hollow pipe section, wherein each end of the coupling tube is adapted to be slidably disposed within an open end of said each hollow pipe section;
    a first coupler clamp and a second coupler clamp, each of the coupler clamps having an inner surface with two outer parallel edges, wherein the inner surface of said each coupler clamp is generally conformable to an outer surface of said each hollow pipe section, and wherein said each coupler clamp is adapted to be disposed in opposing relationship on the outer surfaces of the hollow pipe sections, the first coupler clamp is adapted to be disposed on the upper surfaces of the hollow pipe sections and the second coupler clamp is adapted to be disposed on the lower surfaces of the hollow pipe sections, so that the inner surface of said each coupler clamp contacts a portion of the outer surface of said each hollow pipe section and the outer parallel edges of said each coupler clamp are parallel to a longitudinal axis of said each hollow pipe section; and
    a threaded fastener and a nut for releasably securing the coupler clamps on the hollow pipe sections, and wherein the coupling tube includes a hole extending through opposing walls of the coupling tube, the hole being sized to accommodate passage of the threaded fastener, and wherein said each coupler clamp has a hole sized to accommodate passage of the threaded fastener, so that the threaded fastener is insertable through the first coupler clamp, the coupling tube, and the second coupler clamp so that tightening of the threaded fastener in the nut causes the first and second coupler clamps to secure the hollow pipe sections together.

2. The pipe coupler system as in claim 1, wherein the outer surface of the coupling tube is sized so that the tolerance between the inner surfaces of the hollow pipe sections and the outer surface of the coupling tube is sufficiently tight for providing a stable joint between the hollow pipe sections.

3. The pipe coupler system as in claim 1, wherein at least one of the coupler clamps further comprises at least one reinforcing ridge parallel to the outer parallel edges of said at least one of the coupler clamps.

4. The pipe coupler system as in claim 1, wherein only the outer parallel edges of the inner surfaces of the first and second coupler clamps are adapted to contact the outer surfaces of the hollow pipe sections.

5. The pipe coupler system of claim 4, wherein the second coupler clamp has at least one raised ridge spaced a distance from the hole in the second coupler clamp so that the ridge prevents rotation of the nut when the threaded fastener is rotated.

6. The pipe coupler system of claim 5, wherein said at least one raised ridge is parallel to the outer parallel edges of the second coupler clamp to provide rigidity to the second coupler clamp.

7. The pipe coupler system of claim 6, wherein the coupling tube and the coupler clamps are made of aluminum.

8. A hand rail coupler assembly comprising:
    a plurality of coaxially aligned hand rail sections of staging, wherein each hand rail section has an upper surface and a lower surface:
    a coupling tube having an outer surface conformable to an inner surface of said each hand rail section, wherein each end of the coupling tube is slidably disposed within open ends of the adjacent hand rail sections, wherein the rigidity of the coupling tube is similar to the rigidity of the hand rail sections;
    a first coupler clamp and a second coupler clamp, each of the coupler clamps having an inner surface with two outer parallel edges, wherein the coupler clamps are generally conformable to an outer surface of said each hand rail section, and wherein the coupler clamps are disposed in opposing relationship on the outer surfaces of the hand rail sections, the first coupler clamp disposed on the upper surfaces of said hand rail sections and the second coupler clamp disposed on the lower surfaces of said hand rail sections, so that the inner surface of said each coupler clamp contacts a portion of the outer surface of said each hand rail section and the outer parallel edges of the coupler clamps are parallel to a longitudinal axis of said each hand rail section; and a threaded fastener and a nut for releasably securing the coupler clamps on the hand rail sections and wherein the coupling tube includes a hole extending through opposing walls of the coupling tube, the hole being sized to accommodate passage of the threaded fastener, and wherein said each coupler clamp has a hole sized to accommodate passage of the threaded fastener, so that the threaded fastener is insertable through the first coupler clamp, the coupling tube, and the second coupler clamp so that tightening of the threaded fastener in the nut causes the coupler clamps to secure the hand rail sections.

9. The handrail coupler assembly as in claim 8, wherein at least one of the coupler clamps further comprises at least one reinforcing ridge parallel to the longitudinal axes of the hand rail sections.

10. The hand rail coupler assembly as in claim 8, wherein only the outer parallel edges of the inner surfaces of the first and second coupler clamps contact the outer surfaces of the hand rail sections.

11. The hand rail coupler assembly of claim 10, wherein the second coupler clamp has at least one raised ridge spaced a distance from the hole in the second coupler clamp so that the ridge prevents rotation of the nut when the threaded fastener is rotated.

12. The hand rail coupler assembly of claim 11, wherein said at least one raised ridge is parallel to the longitudinal axes of the hand rail sections to provide rigidity to the second coupler clamp.

13. The hand rail coupler assembly of claim 12, wherein said hand rail sections, coupling tube, and coupler clamps are made of aluminum.

14. A method of joining coaxially aligned tubular hand rail sections comprising the steps of:

providing a plurality of said coaxially aligned tubular hand rail sections, wherein each hand rail section has an upper surface and a lower surface;

providing a coupling tube having an outer surface conformable to an inner surface of said each hand rail section, wherein the coupling tube includes a hole extending through opposing walls of the coupling tube, the hole being sized to accommodate passage of a threaded fastener;

sliding each end of the coupling tube into an open end of said each hand rail section;

disposing a first coupler clamp and a second coupler clamp in opposing relationship on an outer surface of said each hand rail section, each of the coupler clamps having an inner surface with two outer parallel edges and a hole sized to accommodate passage of a threaded fastener, wherein the first coupler clamp is disposed on said upper surfaces of the hand rail sections and the second coupler clamp is disposed on the lower surfaces of the hand rail sections, so that the inner surface of said each coupler clamp contacts a portion of the outer surface of said each hand rail section, and the outer parallel edges of the coupler clamps are parallel to a longitudinal axis of said each hand rail section;

inserting said threaded fastener through the first coupler clamp, the coupling tube, and the second coupler clamp;

threading a nut onto the threaded fastener; and tightening the threaded fastener in the nut to cause the coupler clamps to releasably secure the hand rail sections.

15. The method of claim 14, wherein said hand rail sections, coupling tube and coupler clamps are made of aluminum.

16. The method of claim 15, wherein the tightening of the threaded fastener is done manually.

17. A method of assembling hand rails in staging systems having vertical posts with brackets, wherein the vertical posts are attached at their bottom ends along the edges of a platform, comprising the steps of:

providing a plurality of hand rail sections:

inserting each hand rail section through at least one bracket on a corresponding vertical post so that the hand rail sections along an edge of the platform are coaxially aligned, wherein said each rail section has an upper surface and a lower surface:

providing a coupling tube having an outer surface conformable to an inner surface of said each hand rail section, wherein the coupling tube includes a hole extending through opposing walls of the coupling tube, the hole being sized to accommodate passage of a threaded fastener;

sliding each end of the coupling tube into an open end of said each hand rail section:

disposing a first coupler clamp and a second coupler clamp in opposing relationship on an outer surface of said each hand rail section, each of the coupler clamps having an inner surface with two outer parallel edges and a hole sized to accommodate passage of said threaded fastener, wherein the first coupler clamp is disposed on said upper surfaces of the hand rail sections and the second coupler clamp is disposed on the lower surfaces of the hand rail sections, so that the inner surface of said each coupler clamp contacts a portion of the outer surface of said each hand rail section, and the outer parallel edges of the coupler clamps are parallel to a longitudinal axis of said each hand rail section;

inserting a threaded fastener through the first coupler clamp, the coupling tube, and the second coupler clamp;

threading a nut onto the threaded fastener; and tightening the threaded fastener in the nut to cause the coupler clamps to secure the hand rail sections.

18. The method of claim 17, further comprising the step of crimping the end of the threaded fastener after the threaded fastener has been tightened in the nut so that removal of the nut is prevented.

19. The method of claim 18, wherein the hand rail sections, coupling tube, and coupler clamps are made of aluminum.

20. The method of claim 19, wherein the tightening of the threaded fastener is done manually.

21. A method of assembling hand rails in a staging system comprising the steps of:

providing a staging platform;

providing a plurality of vertical posts, each of the vertical posts having at least one bracket attached thereto, wherein each of the vertical posts are attached at a bottom end along the edge of the staging platform;

providing a plurality of hand rail sections;

inserting each of the plurality of hand rail sections through said at least one bracket on the corresponding vertical post so that the hand rail sections along an edge of the staging platform are coaxially aligned, wherein said each hand rail section has an upper surface and a lower surface;

providing at least one coupling tube having an outer surface conformable to an inner surface of said each hand rail section, wherein said at least one coupling tube includes a hole extending through opposing walls of the coupling tube, the hole being sized to accommodate passage of a threaded fastener;

sliding each end of said at least one coupling tube into an open end of said each hand rail section;

disposing a first coupler clamp and a second coupler clamp in opposing relationship on an outer surface of said each hand rail section, each of the coupler clamps having an inner surface with two outer parallel edges and a hole sized to accommodate passage of the threaded fastener, wherein the first coupler clamp is disposed on the upper surfaces of the hand rail sections and the second coupler clamp is disposed on the lower surfaces of the hand rail sections, so that the inner surface of said each coupler clamp contacts a portion of the outer surface of said each hand rail section, and the outer parallel edges of the coupler clamps are parallel to a longitudinal axis of said each hand rail section;

inserting said threaded fastener through the first coupler clamp, the coupling tube, and the second coupler clamp;

threading a nut onto the threaded fastener; and tightening the threaded fastener in the nut to cause the coupler clamps to secure the hand rail sections.

* * * * *

UNITED STATES PATENT AND TRADEMARK OFFICE
CERTIFICATE OF CORRECTION

PATENT NO.  : 5,615,968
DATED       : 1 April 1997
INVENTOR(S) : Douglas R. VERENSKI et al.

It is certified that error appears in the above-indentified patent and that said Letters Patent is hereby corrected as shown below:

| Column | Line | |
|---|---|---|
| 2 | 52 | Change "tipper" to --upper--. |
| 3 | 8  | Change "tipper" to --upper--. |
| 5 | 22 | Change "shalt" to --shaft--. |

Signed and Sealed this

Twenty-sixth Day of August, 1997

Attest:

BRUCE LEHMAN

*Attesting Officer*   *Commissioner of Patents and Trademarks*